US009160794B2

United States Patent
Lin et al.

(10) Patent No.: US 9,160,794 B2
(45) Date of Patent: Oct. 13, 2015

(54) NETWORK ADDRESS TRANSLATORS (NAT) TYPE DETECTION TECHNIQUES

(75) Inventors: Qingwei Lin, Beijing (CN); Jiang Li, Beijing (CN); Jian-guang Lou, Beijing (CN); Yusuo Hu, Beijing (CN); Fan Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1034 days.

(21) Appl. No.: 12/328,296

(22) Filed: Dec. 4, 2008

(65) Prior Publication Data

US 2010/0146099 A1 Jun. 10, 2010

(51) Int. Cl.
*G06F 15/16* (2006.01)
*H04L 29/08* (2006.01)
*H04L 12/26* (2006.01)
*H04L 29/12* (2006.01)
*H04L 12/24* (2006.01)
*H04L 29/06* (2006.01)

(52) U.S. Cl.
CPC .......... *H04L 67/104* (2013.01); *H04L 12/2697* (2013.01); *H04L 29/12339* (2013.01); *H04L 41/12* (2013.01); *H04L 43/50* (2013.01); *H04L 61/2503* (2013.01); *H04L 69/28* (2013.01)

(58) Field of Classification Search
CPC ...... H04L 12/2697; H04L 43/00; H04L 43/50
USPC .......................... 709/245, 223, 224, 227, 228
See application file for complete search history.

(56) References Cited

U.S. PATENT DOCUMENTS

| | | | |
|---|---|---|---|
| 7,302,496 B1 | 11/2007 | Metzger | |
| 7,328,280 B2 | 2/2008 | Takeda et al. | |
| 7,333,500 B2 | 2/2008 | Roshko | |
| 2004/0024879 A1* | 2/2004 | Dingman et al. | 709/227 |
| 2005/0259637 A1 | 11/2005 | Chu et al. | |
| 2006/0085548 A1* | 4/2006 | Maher et al. | 709/227 |
| 2006/0120293 A1 | 6/2006 | Wing | |
| 2006/0215652 A1* | 9/2006 | Strandridge et al. | 370/389 |
| 2007/0076729 A1 | 4/2007 | Takeda | |

(Continued)

OTHER PUBLICATIONS

D'Acunto et al., A Measurement of NAT & Firewall Characteristics in Peer to Peer Systems, 2009, 5 pg.'s.*

(Continued)

*Primary Examiner* — Daniel C Murray
*Assistant Examiner* — Adam Cooney
(74) *Attorney, Agent, or Firm* — Ladislav Kusnyer; Judy Yee; Micky Minhas

(57) ABSTRACT

Techniques described herein enable peers to determine each peer's NAT type much more efficiently and quickly than when compared with existing techniques. To do so, a peer simultaneously sends multiple test messages to a server. The peer then waits to either receive a response for each of the multiple test messages or may store an indication that no response has been received after a predetermined timeout period. The peer then analyzes the received responses and/or the stored timeout indications to determine the peer's NAT type or to determine that the peer is operating free from concealment by a NAT/firewall device. By simultaneously sending the multiple test messages, the peer may determine the NAT type within a maximum time defined by the predetermined timeout period or a roundtrip time period that is required for communication between the peer and the server. As such, the tools allow for efficient NAT-type detection.

17 Claims, 6 Drawing Sheets

(56) References Cited

U.S. PATENT DOCUMENTS

| | | | |
|---|---|---|---|
| 2008/0118005 A1 | 5/2008 | Yasuma | |
| 2008/0222248 A1* | 9/2008 | Eberlein et al. | 709/204 |
| 2008/0225867 A1 | 9/2008 | Sehgal et al. | |
| 2008/0259943 A1* | 10/2008 | Miyajima et al. | 370/401 |
| 2009/0024762 A1* | 1/2009 | Ganesan | 709/245 |
| 2009/0028167 A1* | 1/2009 | Takeda et al. | 709/245 |
| 2009/0228593 A1* | 9/2009 | Takeda | 709/227 |
| 2010/0077087 A1* | 3/2010 | Roy et al. | 709/228 |

OTHER PUBLICATIONS

Ford et al., Peer-to-Peer Communication Across Network Address Translators, Feb. 17, 2005, 23 pg.'s.*

Baldi, et al., "Providing End-to-End Connectivity to SIP User Agents behind NATs", retrieved on Oct. 23, 2008 at <<http://netgroup.polito.it/research-projects/sip-and-ip-mobility/alex/ICC-submitted.pdf>>, IEEE ICC'08, 2008, pp. 5902-5908.

Rosenberg, et al., "STUN—Simple Traversal of User Datagram Protocol (UDP) through Network Address Translators (NATs)", retrieved on Oct. 29, 2008 at <<http://www.ietf.org/rfc/rfc3489.txt>>, RFC Editor, The Internet Society, 2003, pp. 1-46.

Wacker, et al., "A NAT Traversal Mechanism for Peer-to-Peer Networks", retrieved on Oct. 23, 2008 at <<http://pap.vs.uni-due.de/files/wacker-nat-traversal.pdf>>, P2P '08, 2008, pp. 81-83.

* cited by examiner

NETWORK ADDRESS TRANSLATORS (NAT) TYPE DETECTION TECHNIQUES

BACKGROUND

A peer-to-peer architecture comprises a multitude of interconnected peers, some of which reside behind a network address translator (NAT) and/or a firewall. In order for peers to connect with one another, each peer typically sends out contact information associated with the respective peer. This contact information may include an Internet Protocol (IP) address of the peer, a type of NAT behind which the peer operates, and, if applicable, a NAT address of the peer. When other peers receive this contact information, these other peers may choose to use this contact information to connect with the peer.

A key part of the contact information that peers send out is the NAT type of the peers. However, in order to send out this information to other peers, each peer must first learn the peer's own NAT type. While reliable, traditional techniques are cumbersome and require an undue amount of time.

SUMMARY

This document describes tools for enabling peers of a peer-to-peer architecture to determine each peer's NAT type much more efficiently and quickly than when compared with existing techniques. To do so, a peer may simultaneously send multiple test messages to a server of the peer-to-peer architecture. The peer may then wait to either receive a response for each of the multiple test messages or may store an indication that no response has been received after a predetermined timeout period. The peer may then analyze the received responses and/or the stored timeout indications to determine the peer's NAT type or to determine that the peer is operating free from concealment by a NAT/firewall device. By simultaneously sending the multiple test messages, the peer may determine the NAT type within a maximum time defined by the predetermined timeout period or a roundtrip time period that is required for communication between the peer and the server. As such, the tools provide efficient NAT-type detection.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
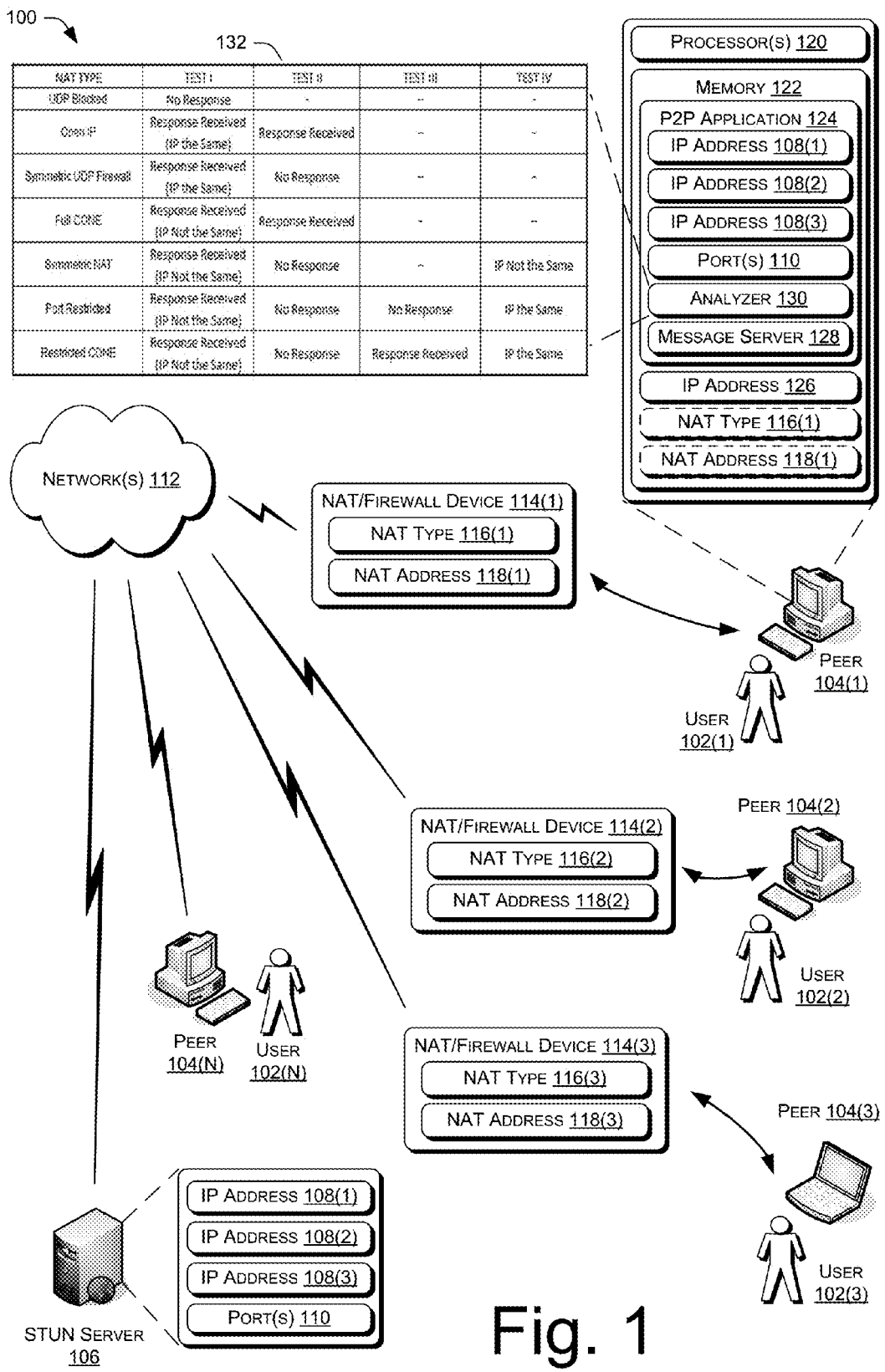
FIG. 1 depicts an illustrative peer-to-peer architecture in which peers may simultaneously send multiple test messages to a server of the architecture. By doing so, a peer may efficiently and quickly determine if the peer resides behind a Network Address Translator (NAT)/firewall device and, if so, may determine a NAT type of the NAT/firewall device.

This document describes tools for enabling a peer of a peer-to-peer architecture to efficiently and quickly determine whether the peer resides behind a Network Address Translators (NAT)/firewall device and, if so, the type of the NAT/firewall device. Traditional techniques for determining NAT types require long amounts of time and are generally inefficient.

For instance, one traditional technique requires that a peer serially send out four test messages, one after the other. That is, a peer sends a first test message to a server and either waits for a response from the server or waits until a timeout period elapses. At this point, the peer may then send out a second test message to the server. Again, the peer then waits for either a server response or a timeout, before sending a third test message. After receiving a server response for the third test message or after elapse of the timeout period, the peer may finally send a fourth test message to the server. Again, the peer may wait for a response or until the timeout period elapses.

Finally, the peer may use the received responses or the stored timeout indications to determine a NAT type of the peer. However, as can be seen, these traditional techniques may require a large amount of time for a peer to determine the peer's NAT type. For instance, if the peer resides between a NAT/firewall device having a type of Port Restricted, the time required for the peer to detect this NAT type is the summation of two timeout periods and two roundtrip time periods. Furthermore, if the peer has a NAT type of Restricted Cone, then the time required for the peer to detect this NAT type is the summation of one timeout period and three roundtrip time periods.

The techniques described below, meanwhile, allow a peer to detect the peer's NAT type much more efficiently and quickly than when compared with existing techniques. To do so, a peer may simultaneously send multiple test messages to a server of the peer-to-peer architecture. The peer may then wait to either receive a response for each of the multiple test messages or may store an indication that no response has been received after a predetermined timeout period. The peer may then analyze the received responses and/or the stored timeout indications to determine the peer's NAT type or to determine that the peer is operating free from concealment by a NAT/firewall device. By simultaneously sending the multiple test messages, the peer may determine the NAT type within a maximum time defined by the predetermined timeout period or a roundtrip time period that is required for communication between the peer and the server. As such, the tools provide efficient NAT-type detection.

The discussion begins with a section entitled "Illustrative Architecture," which describes one non-limiting environment that may implement the claimed tools. It is noted, however, that this architecture is but one of many and that the claimed tools may operate in other architectures, including architectures other than peer-to-peer architectures. A section entitled "Illustrative Flow Diagram" follows and pictorially illustrates a process of a peer quickly and efficiently determining the peer's NAT type. A third and final section, entitled "Illustrative Processes," describes additional processes for leveraging the described tools.

This brief introduction, including section titles and corresponding summaries, is provided for the reader's convenience and is not intended to limit the scope of the claims, nor the proceeding sections.

Illustrative Architecture

FIG. 1 depicts an illustrative peer-to-peer architecture 100 that may employ the described techniques. As illustrated, architecture 100 includes one or more users 102(1), 102(2), ..., 102(N) operating peers 104(1), 104(2), ..., 104(N). Architecture 100 also includes a User Datagram Protocol through Network Address Translators (STUN) server 106. In some instances, STUN server 106 includes three Internet Protocol addresses 108(1), 108(2), and 108(3), as well as one or more ports 110, which may allow peers 104 (1)-(N) to connect and communicate with STUN server 106. While FIG. 1 illustrates STUN server 106, other environments may employ other types of servers or may not employ a server at all. Peers 104(1)-(N), meanwhile, may comprise an array of computing devices, such personal computers, laptop computers, mobile phones, set-top boxes, game consoles, personal digital assistants (PDAs), portable media players (PMPs) (e.g., portable video players (PVPs) and digital audio players (DAPs)), and the like. Note that a network 112, which couples peers 104(1)-(N) as well as STUN server 106, may comprise the Internet, a Local Area Network (LAN), a Wide Area Network (WAN), a wireless network, and/or the like.

As illustrated, some of peers 104(1)-(N) reside behind one or more Network Addressor Translator (NAT) and/or firewall devices 114(1), 114(2), and 114(3). These NAT/firewall devices may comprise hard, software, or a combination thereof. For instance, peer 104(1) resides behind NAT/firewall device 114(1), while peers 104(2) and 104(3) reside behind NAT/firewall devices 114(2) and 114(2), respectively. As is known, NAT devices 114(1)-(N) function to receive outgoing messages from an internal internet protocol (IP) address of a peer, modify the IP address in a packet header of a respective message to the NAT address (or to the "external IP address"), and route the message to the specified destination.

In peer-to-peer architecture 100, however, some peers do not reside behind a NAT and/or firewall device. Stated otherwise, these peers are not hidden behind either a NAT or a firewall, and are known as public domain peers. As illustrated, peer 104(N) does not reside behind a NAT or a firewall and, as such, is a public domain peer.

Each of NAT/firewall devices 114(1)-(3) may have a particular NAT type 116(1), 116(2), and 116(3), and may also have a particular a particular NAT address(es) 118(1), 118(2), and 118(3). For instance, each device may be one of the following six NAT types: (i) User Datagram Protocol (UDP) Blocked; (2) Symmetric UDP Firewall; (3) Full Cone; (4) Symmetric NAT; (5) Port Restricted, or (6) Restricted Cone. Peers such as peer 104(N) that are not hidden behind a NAT or a firewall, meanwhile, may be deemed to have a NAT type of "Open IP." That is, even though some peers (such as peer 104(N)) do not reside behind a NAT/firewall device, these peers may still be deemed to have a NAT type (again, "Open IP").

As discussed above, when peers 104(1)-(N) wish to connect with one another, these peers must inform the other peers of one another's address(es) and NAT types. As is known, some combinations of NAT types are more compatible with one another. Therefore, by informing other peers of a peer's NAT type, the peers are able to make educated decisions as to which peer or peers to establish a connection with. To do so, the peer must perform a NAT type detection to determine the peer's NAT type. In some instances, each of peers 104(1)-(N) may determine the respective peer's NAT type by performing a STUN protocol with STUN server 106. Once a peer learns of the peer's NAT type and NAT address, the peer may share this information (in addition to the peer's internal IP address) to allow other peers to contact the peer.

Each of peers 104(1)-(N) includes one or more processors and memory. For instance, FIG. 1 illustrates that peer 104(1) includes one or more processors 120 and memory 122. As illustrated, memory 122 stores a peer-to-peer application 124, which may comprise any sort of application that allows peer 104(1) to connect with peers 104(2)-(N) for any sort of reason. For instance, application 124 may allow peer 104(1) to share and/or receive music, video or other files with peers 104(2)-(N). Memory 122 may also store an internal IP address 126 of peer 104(1) and, potentially, the NAT type 116(1) and the NAT address 118(1) of the NAT/firewall device 114(1) behind which peer 104(1) resides. In some instances, peer 104(1) may employ the techniques described above and below in order to determine or detect NAT type 116(1) (and, potentially, NAT address 118(1)).

As illustrated, peer-to-peer application 124 stores IP addresses 108(1)-(3) and the location of ports 110 of STUN server 106. With this information, peer 104(1) may send one or more messages to STUN server 106. Application 124 also includes a message server 128 and an analyzer 130. Message server 128 creates and sends one or more test messages to STUN server 106. Analyzer 130, meanwhile, functions to analyze response messages received from STUN server 106 in response to the test messages (as well timeout indications showing that peer 104(1) did not receive a response) to determine a NAT type of peer 104(1). As discussed above, analyzer 130 may determine that peer 104(1) does not reside behind a NAT/firewall device (and, hence has a NAT type of Open IP), or analyzer 130 may determine that peer 104(1) resides behind a NAT/firewall device having one of the six NAT types listed above.

FIG. 1 illustrates that analyzer 130 may store or otherwise have access to a table 132. Table 132 may list each of the seven potential NAT types (the six listed above plus the Open-IP NAT type) and the values of response or lack of responses from STUN server 106 that indicate the particular NAT type. That is, table 132 maps the combination of STUN server responses to NAT types. While table 132 here illustrates seven potential NAT types, other embodiments may include more or fewer NAT types. Furthermore, it is specifically noted that while FIG. 1 depicts a table, analyzer 130 may determine NAT type 116(1) with access to any other sort of data storage or in any other suitable manner.

In some instances, message server 128 of peer 104(1) simultaneously sends multiple test messages (e.g., four test messages) to STUN server 106. Stated otherwise, message server 128 may send multiple test messages in parallel to STUN server 106. For instance, message server 128 may send a first test message (or "binding request") to a first IP address (e.g., IP address 108(1)) of STUN server 106. This first test message may be sent without any flags set in the CHANGE-REQUEST attribute and the RESPONSE-ADDRESS attribute. If STUN server 106 sends a response (or "binding request"), the response may be sent to the same address and port from which peer 104(1) sent the first test message.

At or near the same time (or without waiting for a response or a timeout indication for the first test message), message server 128 may send a second test message to STUN server 106. In some instances, message server 128 again sends the second message to IP address 108(1). Here, the second test message has flags set for the "Change IP" and "Change Port" fields of the CHANGED-REQUEST attribute. Next, message server 128 may send a third test message having similar or the same qualities as the second test message to IP address 108(1) of STUN server 106. In some instances, message server 128 may package the first three test messages into a single message before sending this combined message to IP address 108(1) of STUN server 106.

Finally, at or near the same time as the sending of the first three test messages, message server 128 may send a fourth test message. This fourth test message may have similar or the same qualities as the first test message, although the message server 128 may send the fourth test message to the third IP address 108(3) of STUN server 106.

In response to the four test messages sent, STUN server may or may not send one or more response messages back to peer 104(1). Based on these responses or lack of responses from STUN server 106, analyzer 130 makes a determination of the NAT type of peer 104(1). However, because message server 128 may send these four test message simultaneously, peer 104(1) learns NAT type 116(1) in a quick and efficient manner.

Figure 2:
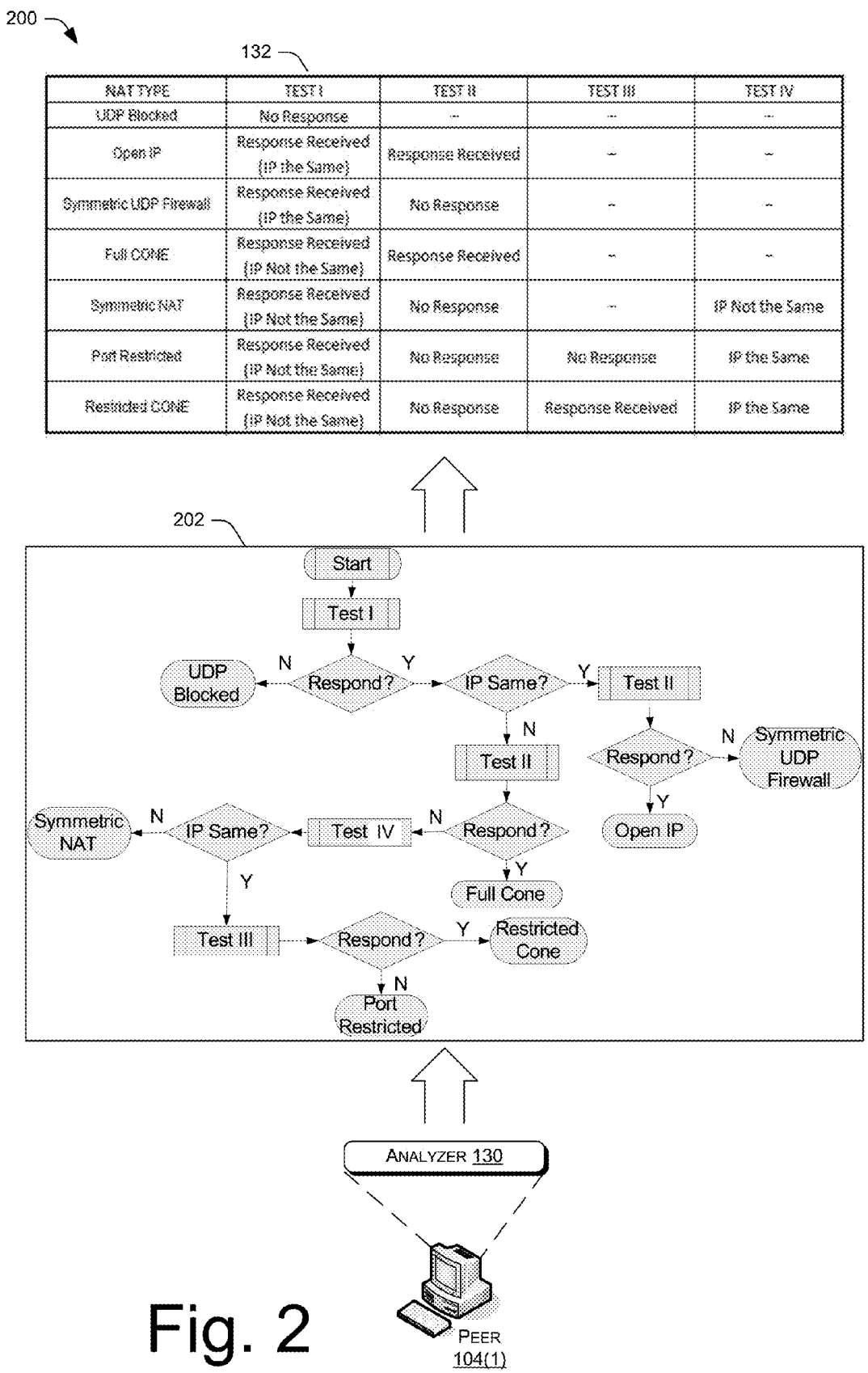
FIG. 2 depicts a process that an analyzer of a peer from FIG. 1 may undertake in order to determine how to map server responses and lack of responses to particular NAT types.

FIG. 2 illustrates a process 200 that analyzer 130 of peer 104(1) may undertake in order to determine how to map server responses and lack of responses to particular NAT types. Process 200 illustrates that analyzer 130 may walk through a logic diagram 202 to learn how different server responses map to different NAT types. After walking through logic diagram 202, analyzer may create and store table 132. Of course, while process 200 illustrates analyzer 130 traversing diagram 202, a developer of peer-to-peer application 124 may simply program analyzer 130 to determine NAT types according to table 132.

FIG. 2 illustrates table 132 in detail. If peer 104(1) does not receive a response to the first test message from STUN server 106 after a predetermined timeout period, then analyzer 130 determines that peer 104(1) is incapable of UDP connectivity. As such, table 132 indicates that such a peer has a NAT type of UDP blocked. Next, if peer 104(1) receives a response to the first test message from STUN server 106, then peer 104(1) analyzes the MAPPED-ADDRESS attribute. If this IP address and port are the same as the local IP address 126, then peer 104(1) knows that it is not operating behind a NAT/firewall device. Analyzer 130, therefore, indicates that peer 104(1) has a NAT type of Open IP.

In instances where: (i) peer 104(1) receives a response to the first test message and the returned IP address is the same as IP address 126, but (ii) no response to the second test message is received after the timeout period, analyzer 130 determines that peer 104(1) has a NAT type of Symmetric UDP firewall.

Next, if peer 104(1) receives a response to the first test message, but the IP address is not the same, then analyzer 1036 knows that peer 104(1) has a NAT type of one of Full Cone, Symmetric NAT, Port Restricted, or Restricted Cone.

To determine which of these is appropriate, analyzer 130 looks to the response or lack of response to the second test message. If peer 104(1) receives a response to the second test message, then analyzer 130 determines that peer 104(1) has a NAT type of Full Cone. Otherwise, analyzer 130 moves to the response or lack of responses to the third and fourth test messages.

First, analyzer 130 may analyze the response to the fourth test message. Here, analyzer 130 looks to see which IP address of STUN server 106 the response to the first test message was sent from. Analyzer 130 then compares this IP address to the IP address of the server from which the response to the fourth test message is sent from. If these IP addresses differ, then analyzer 130 determines that peer 104(1) has a NAT type of Symmetric NAT. Otherwise, analyzer 130 may look at the response or lack of response to the third test message. Here, if peer 104(1) has not received a response to the third test message, then analyzer 130 determines that peer 104(1) has a NAT type of Port Restricted. If peer 104(1) has received a response, meanwhile, then analyzer 130 determines that peer 104(1) has a NAT type of Restricted Cone.

Again, because analyzer 130 stores or otherwise has access to table 132, and because message server 128 may simultaneously send all four test messages at once, peer 104(1) may learn of the peer's NAT type in a fast and efficient manner.

Figure 3:
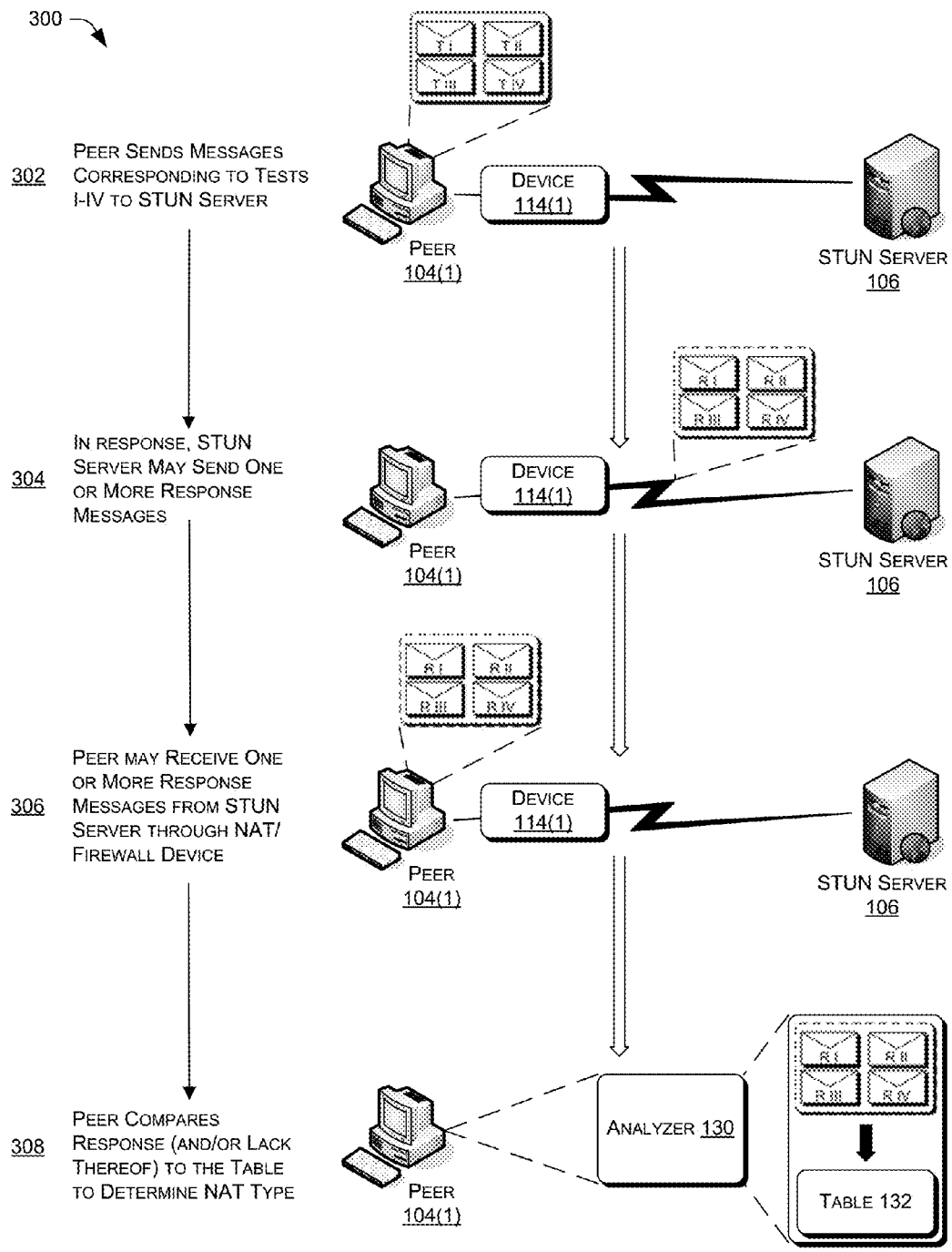
FIG. 3 depicts an illustrative flow diagram that includes a peer simultaneously sending four test messages to a server of the architecture of FIG. 1. Based on the responses received (or lack thereof), the peer may determine the peer's NAT type.

Having described an illustrative peer-to-peer architecture that may implement the described techniques, FIG. 3 depicts an illustrative flow diagram where a peer of this architecture employs the techniques to determine the peer's NAT type. It is to be appreciated, however, that this architecture is merely illustrated and these techniques may be similarly implemented in an array of other architectures (e.g., non client/server architectures, non-peer-to-peer architectures, and otherwise).

Illustrative Flow Diagram

FIG. 3 depicts an illustrative flow diagram of a process 300 that includes peer 104(1) simultaneously sending four test messages to STUN server 106 of architecture 100 of FIG. 1. Based on the responses received (or lack thereof), the peer may determine the peer's NAT type 116(1).

Process 300 includes peer 104(1) simultaneously sending at operation 302 the four test messages discussed above to STUN server 106. Again, peer 104(1) may store the different IP addresses of STUN server 106 and may send these different tests to different IP addresses. For instance, peer 104(1) may send the first three test messages as a combined message to first IP address 108(1) of server 106 and may send the fourth test message to third IP address 108(3) of server 106.

Next, operation 304 represents that, in response, STUN server 106 may send one or more response messages back to peer 104(1). In instances where peer 104(1) has a NAT type of UDP blocked, however, NAT/firewall device 114(1) may block the test messages sent at operation 302 and, as such, STUN server 106 would not send response messages at operation 304. In instances where STUN server 106 sends one or more response messages, however, peer 104(1) may receive one or more these messages at operation 306.

Finally, at operation 308, analyzer 130 of peer 104(1) may compare the received responses and/or lack of responses to determine a NAT type of peer 104(1). For instance, analyzer 130 may compare the values of the received responses (if any) and the stored timeout indications (if any) to table 132 to determine NAT type 116(1). By sending out all four test messages in parallel, peer 104(1) learns NAT type 116(1) much more quickly than when peer 104(1) sends these test messages out serially. In fact, with use of the described techniques, the maximum time that it takes peer 104(1) to learn NAT type 116(1) is either the timeout period ($T_{TO}$) or the amount of time that it takes a message to be sent to and received from server 106 (i.e., the "roundtrip time period," $T_{RT}$). Table 1, reproduced below, illustrates the time savings that the described techniques create.

TABLE 1

| NAT Types | Serially-Sent Test Messages | Test Messages Sent in Parallel |
| --- | --- | --- |
| UDP Blocked | $T_{TO}$ | $T_{TO}$ |
| Open IP | $2 * T_{RT}$ | $T_{RT}$ |
| Symmetric UDP Firewall | $T_{RT} + T_{TO}$ | $T_{TO}$ |
| Full CONE | $2 * T_{RT}$ | $T_{RT}$ |
| Symmetric NAT | $2 * T_{RT} + T_{TO}$ | $T_{TO}$ |
| Port Restricted | $2 * T_{TO} + 2 * T_{RT}$ | $T_{TO}$ |
| Restricted CONE | $3 * T_{RT} + T_{TO}$ | $T_{TO}$ |

Illustrative Processes

Figure 4:
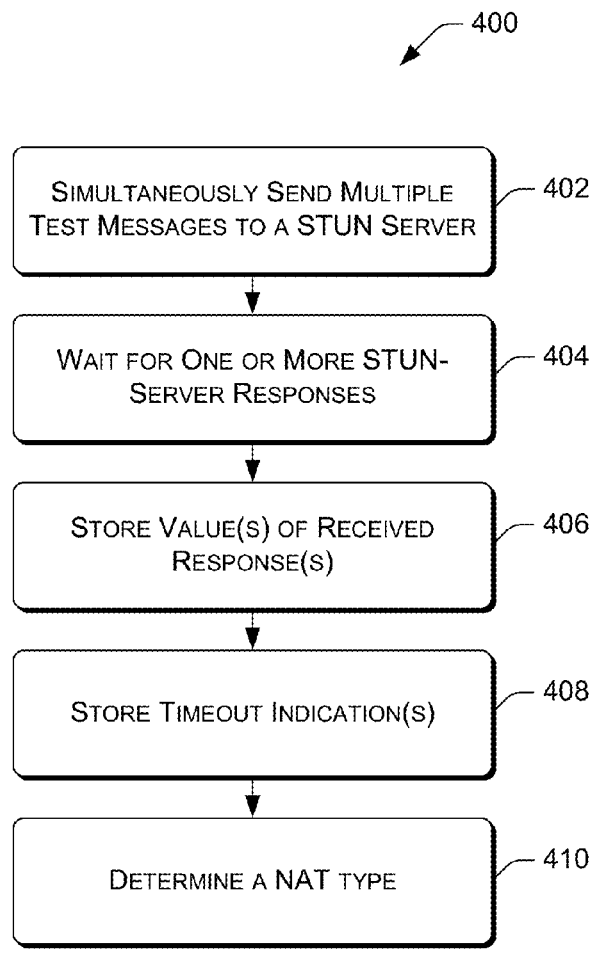
FIGS. 4-6 depict illustrative process for efficiently and quickly determining whether a peer resides behind a NAT/firewall device and, if so, the type of the NAT/firewall device.
Figure 5:
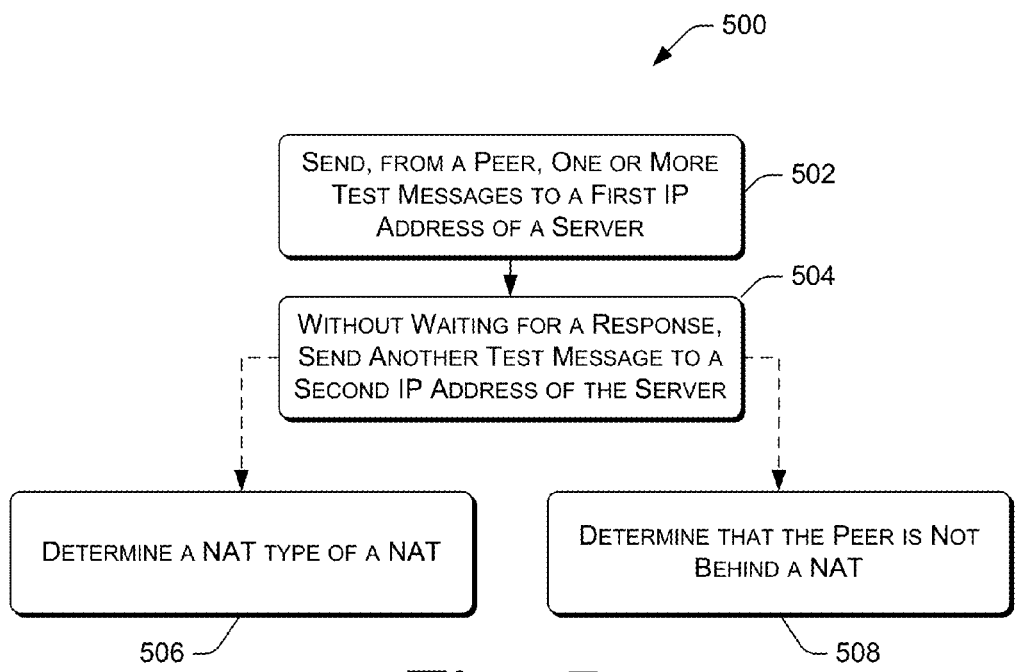
Figure 6:
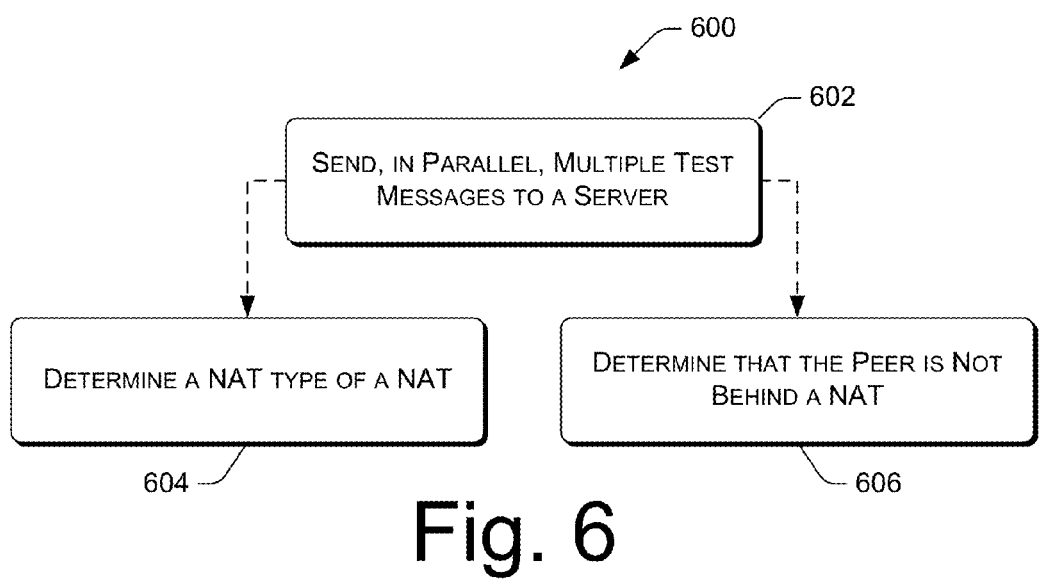

FIGS. 4-6 depict illustrative processes 400, 500 and 600 that allow a peer to quickly and efficiently determine a NAT type of the peer. These processes, as well as other processes described throughout, are each illustrated as a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 400 includes operation 402, which represents simultaneously sending multiple test messages to a STUN server. In some instances, a peer such as peer 104(1) may simultaneously send four test messages to the server. Next, operation 404 waits a certain amount of time (e.g., a timeout period) for one or more responses to the multiple test messages. Operation 406 then stores the values of any responses received from the STUN server. For instance, operation 406 may simply store an indication that a particular response was received or may store an indication of an IP address from which it was received. Similarly, operation 408 may store one or more timeout indications if the server does not respond to a particular test message within the timeout period. Finally, operation 410 determines a NAT type of the peer (or other device) based at least in part on the stored values of the responses and/or the stored timeout indications.

FIG. 5 illustrates process 500, which includes sending one or more test messages from a peer to a first IP address of a server at operation 502. Next, without waiting for a response to the one or more test messages, operation 504 sends another test messages to a second IP address of the server. In some instances, the peer (or other device) may send the one or more test messages and the another test message simultaneously, while in other instances the peer (or other device) may send them near in time. For example, the peer may send the another test message before receiving a response to the one or more messages and without waiting for a timeout indication. Based at least in part on the test messages (and potentially the server response or lack thereof to the test messages), operation 506 may determine a NAT type of a NAT behind which the peer is operating. Operation 508, meanwhile, represents that the peer may alternatively determine that the peer does not reside behind a NAT. In the latter instances, the peer may assign itself a NAT type of "Open IP."

Finally, FIG. 6 illustrates process 600. This process includes sending, at operation 602, multiple (e.g., four) test messages in parallel to a server, such as STUN server 106 from FIG. 1. Based at least in part on a response and/or a lack of a response from the server to the multiple test messages sent in parallel, process 600 may proceed to operation 604 or operation 606. As illustrated, operation 604 represents that the peer may determine a NAT type of a NAT behind which the peer is operating. Operation 606, meanwhile, represents that the peer may alternatively determine that the peer does not reside behind a NAT. Again, in the latter instances, the peer may assign itself a NAT type of "Open IP."

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
employing a processor that executes instructions retained in a computer-memory, the instructions, when executed by the processor, implementing operations including:
simultaneously sending, from a peer computing device in a peer-to-peer architecture, multiple test messages to a Simple Traversal of User Datagram Protocol through Network Address Translators (STUN) server of the peer-to-peer architecture to detect a Network Address Translator (NAT) type of a NAT/firewall device operating between the peer computing device and the STUN server, the NAT type corresponding to one of six different NAT types that include a User Datagram Protocol (UDP) blocked, a Symmetric UDP Firewall, a Full Cone, a Symmetric NAT, a Port Restricted, and a Restricted Cone;
waiting a predetermined amount of time for one or more responses to the multiple test messages from the STUN server;
if a response of the one or more responses to a particular test message of the multiple test messages is received in the predetermined amount of time, storing a value of the response;
if a response of the one or more responses to a particular test message of the multiple test messages is not received in the predetermined amount of time, storing a timeout indication indicating the peer computing device does not receive the particular test message; and
determining that the NAT type of the NAT/firewall device corresponds to one of the six different NAT types, based at least in part on values of the one or more responses received from the STUN server and timeout indications corresponding to the multiple test messages, wherein the determining that the NAT type corresponds to any one of the six different NAT types occurs within a time period substantially equivalent to the greater of a timeout time period and a roundtrip time period.

2. The computer-implemented method as recited in claim 1, wherein the determining comprises determining the NAT type of the NAT/firewall device approximately within one timeout time period.

3. The computer-implemented method as recited in claim 1, wherein the simultaneously sending of the multiple test messages to the STUN server comprises simultaneously sending four test messages to the STUN server.

4. A computer-implemented method, comprising:
employing a processor that executes instructions retained in a computer-memory, the instructions, when executed by the processor, implementing operations including:
sending three test messages to a first Internet Protocol (IP) address of a server of a peer-to-peer architecture and a fourth test message to a second IP address of the server, the second IP address being different from the first IP address; and
based on receiving no response or one or more responses from the server within a predetermined amount of time:
determining a Network Address Translator (NAT) type of a NAT/firewall device operating between a peer computing device and the server, the NAT type corresponding to one of six different NAT types that include a User Datagram Protocol (UDP) blocked, a Symmetric UDP firewall, a Full Cone, a Symmetric NAT, a Port Restricted, and a Restricted Cone, and wherein the determining that the NAT type corresponds to any one of the six different NAT types occurs within a time period substantially equivalent to the greater of a timeout time period and a roundtrip time period.

5. The computer-implemented method as recited in claim 4, wherein the sending of the three test messages and the fourth test message comprises sending the three test messages and the fourth test message approximately simultaneously.

6. The computer-implemented method as recited in claim 4, wherein the sending of the three test messages and the fourth test message comprises sending the three test messages and the fourth test message in parallel with one another.

7. The computer-implemented method as recited in claim 4, wherein the sending of the three test messages to the first IP address of the server comprises sending three test messages as a single combined message to the first IP address of the server.

8. The computer-implemented method as recited in claim 7, wherein the single combined message sent to the first IP address of the server and the fourth test message sent to the second IP address of the server are sent approximately simultaneously.

9. The computer-implemented method as recited in claim 4, further comprising, based on the receiving no response or one more responses from the server;
determining that the peer computing device is operating free from concealment by the NAT/firewall device; and
assigning a NAT type of Open IP to the peer computing device.

10. A computer-implemented method, comprising:
employing a processor that executes instructions retained in a computer-memory, the instructions, when executed by the processor, causes the processor to perform acts comprising:
sending, in parallel, multiple test messages to a server of a peer-to-peer architecture to determine whether a peer computing device is operating behind a Network Address Translator (NAT)/firewall device;
receiving no response or one or more responses from the server to the multiple test messages sent in parallel within a predetermined amount of time;
determining that the peer computing device is operating behind a NAT/firewall device, based at least in part on the receiving; and
determining that a NAT type of the NAT/firewall device corresponds to one of six different NAT types that include a User Datagram Protocol (UDP) blocked, a Symmetric UDP Firewall, a Full Cone, a Symmetric NAT, a Port Restricted, and a Restricted Cone, based at least in part the receiving, and wherein the determining that the NAT type corresponds to any one of the six different NAT types occurs within a time period substantially equivalent to the greater of a timeout time period or a roundtrip time period for communication between the server and the peer computing device.

11. The computer-implemented method as recited in claim 10, wherein the sending of the multiple test messages in parallel comprises sending the multiple test messages approximately simultaneously.

12. The computer-implemented method as recited in claim 10, wherein the sending of the multiple test messages in parallel comprises sending four test messages approximately simultaneously.

13. The computer-implemented method as recited in claim 10, wherein the sending of the multiple test messages in parallel comprises sending at least two of the multiple test messages to different Internet Protocol (IP) addresses of the server of the peer-to-peer architecture.

14. The computer-implemented method as recited in claim 12, wherein the determining of the NAT type of the NAT/firewall device comprises determining that the NAT type of the NAT/firewall device corresponds to the User Datagram Protocol (UDP) Blocked, based at least in part on receiving no response to a first test message of the four test messages.

15. The computer-implemented method as recited in claim 12, wherein the determining of the NAT type of the NAT/firewall device comprises determining that the NAT type of the NAT/firewall device corresponds to the Symmetric UDP firewall based at least in part on receiving a response to a second test message of the four test messages, wherein the response is a return IP address that is identical to an IP address of the peer computing device.

16. The computer-implemented method as recited in claim 12, wherein the determining of the NAT type of the NAT/firewall device comprises determining that the NAT type of the NAT/firewall device corresponds to one of the Full Cone, the Symmetric NAT, the Port Restricted, or the Restricted Cone based at least in part on:
receiving a response to a second test message of the four test messages,
receiving a response to a third test message of the four test messages, and
receiving a response to a fourth test message of the four test messages that includes a return IP address that is identical to an IP address of the peer computing device.

17. The computer-implemented method as recited in claim 1, wherein the timeout time period comprises a predetermined time period that allows for receiving a response from the STUN server; and the roundtrip time period comprises a time period that allows for a message to be sent to the STUN server and for a response to be received from the STUN server.

* * * * *